United States Patent
Lyu et al.

(10) Patent No.: US 11,507,074 B2
(45) Date of Patent: Nov. 22, 2022

(54) METHOD FOR ASSET MANAGEMENT OF SUBSTATION

(71) Applicant: HYOSUNG HEAVY INDUSTRIES CORPORATION, Seoul (KR)

(72) Inventors: Eun Tae Lyu, Changwon-si (KR); Jae Ryong Jung, Gimhae-si (KR); Hwang Dong Seo, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 518 days.

(21) Appl. No.: 16/607,925

(22) PCT Filed: Apr. 26, 2018

(86) PCT No.: PCT/KR2018/004866
§ 371 (c)(1),
(2) Date: Oct. 24, 2019

(87) PCT Pub. No.: WO2018/199656
PCT Pub. Date: Nov. 1, 2018

(65) Prior Publication Data
US 2020/0096983 A1   Mar. 26, 2020

(30) Foreign Application Priority Data
Apr. 28, 2017 (KR) .................... 10-2017-0055656

(51) Int. Cl.
*G05B 23/02* (2006.01)
*G06Q 10/06* (2012.01)
*G06F 11/00* (2006.01)

(52) U.S. Cl.
CPC ..... *G05B 23/0213* (2013.01); *G05B 23/0218* (2013.01); *G05B 23/0283* (2013.01); *G06F 11/008* (2013.01); *G06Q 10/067* (2013.01)

(58) Field of Classification Search
CPC ............ G05B 23/0213; G05B 23/0218; G05B 23/0283; G06F 11/008; G06Q 10/067
(Continued)

(56) References Cited

U.S. PATENT DOCUMENTS 6,799,154 B1 * 9/2004 Aragones ............... G06F 11/008
  703/22
7,149,659 B1 * 12/2006 Lesmerises ........... G06F 11/008
  702/182
(Continued)

FOREIGN PATENT DOCUMENTS

CN  102723775 A  10/2012
CN  202931037 U  5/2013
(Continued)

OTHER PUBLICATIONS

Yin et al., "Distribution Feeder Scheduling Considering Variable Load Profile and Outage Costs", May 2009, IEEE Transactions on Power Systems, vol. 24 (Year: 2009).*
(Continued)

*Primary Examiner* — Brian S Cook
(74) *Attorney, Agent, or Firm* — Novick, Kim & Lee PLLC; Jae Youn Kim (57) ABSTRACT

An asset management method for a substation in accordance with the present invention generates a unique reliability model for each element of the substation by comparing reliability of a reference reliability model for each substation type with a health index of the each element thereof generated based on state data and real-time monitoring data of the each element of the substation and compensating the reference reliability model for the each element of the substation; assessing system reliability index and economic feasibility for each maintenance scenario based on a reference system reliability model for each candidate element subject to maintenance among the elements of the substation; selecting (Continued)

a maintenance scenario as a result of the health index and the unique reliability model for the each element of the substation, the system reliability index, and the economic feasibility and updating the unique reliability model for the each element of the substation by executing maintenance.

4 Claims, 5 Drawing Sheets

(58) Field of Classification Search
USPC .......................................................... 703/18
See application file for complete search history.

(56) References Cited

U.S. PATENT DOCUMENTS

| | | | |
|---|---|---|---|
| 8,126,574 | B2 | 2/2012 | Discenzo et al. |
| 8,185,346 | B2* | 5/2012 | Sjostrand .......... G05B 23/0283 |
| | | | 702/179 |
| 10,101,406 | B2* | 10/2018 | Park ................. G01R 31/3648 |
| 10,422,837 | B2* | 9/2019 | Park ..................... G01R 31/396 |
| 10,444,747 | B2* | 10/2019 | Keene ..................... G06Q 50/06 |
| 10,663,522 | B2* | 5/2020 | You .......................... B60L 58/15 |
| 10,671,769 | B2* | 6/2020 | Anfriani ................ G06Q 50/30 |
| 10,928,456 | B2* | 2/2021 | You ...................... G06N 3/0454 |
| 2002/0049563 | A1* | 4/2002 | Vetter .................. G05B 13/024 |
| | | | 702/184 |
| 2004/0044499 | A1 | 3/2004 | House et al. |
| 2006/0282362 | A1* | 12/2006 | Nasr ...................... G06Q 10/10 |
| | | | 705/35 |
| 2007/0198215 | A1* | 8/2007 | Bonanni ............ G05B 23/0251 |
| | | | 702/182 |
| 2009/0265118 | A1* | 10/2009 | Guenther ............... G06Q 10/06 |
| | | | 702/34 |
| 2012/0239320 | A1 | 9/2012 | Frei et al. |
| 2015/0302332 | A1 | 10/2015 | Wang et al. |
| 2015/0363750 | A1 | 12/2015 | Svensson et al. |

FOREIGN PATENT DOCUMENTS

| | | |
|---|---|---|
| CN | 103154845 A | 6/2013 |
| CN | 103633739 A | 3/2014 |
| CN | 104504246 A | 4/2015 |
| CN | 104715294 A | 6/2015 |
| CN | 104950759 A | 9/2015 |
| CN | 105023104 A | 11/2015 |
| CN | 105471656 A | 4/2016 |
| CN | 105514991 A | 4/2016 |
| CN | 105809322 A | 7/2016 |
| CN | 106373028 A | 2/2017 |
| FR | 3023390 A1 | 1/2016 |
| JP | 2002-297709 A | 10/2002 |
| JP | 2010-233421 A | 10/2010 |
| JP | 4991627 B2 | 8/2012 |
| JP | 2014-016691 A | 1/2014 |
| JP | 2016-167194 A | 9/2016 |
| KR | 10-2007-0014564 A | 2/2007 |
| KR | 10-2009-0001148 A | 1/2009 |
| KR | 10-2010-0129931 A | 12/2010 |
| KR | 10-2011-0034508 A | 4/2011 |
| KR | 10-2011-0076451 A | 7/2011 |
| KR | 10-2012-0092868 A | 8/2012 |
| KR | 10-1189780 B1 | 10/2012 |
| KR | 10-2012-0128504 A | 11/2012 |
| KR | 10-1267429 B1 | 5/2013 |
| KR | 10-2013-0109506 A | 10/2013 |
| KR | 10-2013-0140237 A | 12/2013 |
| KR | 10-2014-0038265 A | 3/2014 |
| KR | 10-2014-0065633 A | 5/2014 |
| KR | 10-1597993 B1 | 2/2016 |
| KR | 10-2016-0092527 A | 8/2016 |
| KR | 10-2016-0093119 A | 8/2016 |
| KR | 10-1683262 A | 12/2016 |
| KR | 10-2018-0076905 A | 7/2018 |
| KR | 10-2018-0076906 A | 7/2018 |
| KR | 10-1904868 B1 | 10/2018 |
| WO | 2008-143020 A1 | 11/2008 |
| WO | 2010077488 A2 | 7/2010 |

OTHER PUBLICATIONS

Goyal et al., "Asset Health Management Using Predictive and Prescriptive Analytics for the Electric Power Grid", Jan./Feb. 2016, IBM J.Res. & Dev., vol. 60, No. 1, pp. 4:1-4:14.

Kin et al., "Distribution Feeder Scheduling Considering Variable Load Profile and Outage Costs", IEEE Transactions an Power Systems, May 2009, vol. 24, No. 2.

Zhu, "A New Methodology of Analytical Formula Deduction and Sensitivity Analysis of EENS in Bulk Power System Reliability Assessment.", IEEE, 2006, pp. 825-831.

* cited by examiner

METHOD FOR ASSET MANAGEMENT OF SUBSTATION

FIELD OF THE INVENTION

The present invention relates to an asset management method for a substation; and more particularly to, the asset management method for the substation of deriving an optimal management plan for each element of the substation depending on a health index of the each element of the substation.

BACKGROUND OF THE INVENTION

Among power systems, a transmission system or a distribution system has a substation to raise or reduce output of a generator or voltage of the system. In addition to a transformer for raising or reducing voltage, the substation includes devices or systems for centralizing or distributing power, those for controlling tidal current, or those for protecting and controlling its devices.

For example, in a gas circuit breaker used for a gas insulated switchgear or GIS, a gas pressure sensor for detecting gas pressure change, current and voltage detectors, etc. are installed while a transformer has a thermometer, a pressure gauge, a liquid measuring sensor, a current detector, etc. as sensors for detecting its state.

Those sensors are connected to a protective system, a measuring system, a controller, and a devices-monitoring system through cables which transmit electronic signals. Again, the protective system, the measuring system, the controller, and the devices-monitoring system are connected to a superior substation-monitoring controller through cables which transmit the electronic signals.

The substation has very complicated equipment to stably supply electricity which monitors operational state of a variety of devices such as a circuit breaker installed in the substation and also provides a monitoring system to detect a failure symptom in advance to prevent such failure or recover in rapid response to any incurred failure.

As it is difficult to identify accurate states of elements of the substation, the need for optimized techniques for asset management such as an element replacement cycle, and a maintenance plan is raised and a plan for solving such requirements is needed.

DETAILED EXPLANATION OF THE INVENTION

Objects of the Invention

An object of the present invention is to provide a method of calculating a reliability model by substation type based on basic information on power equipment and information on failure history of elements of a substation.

Another object of the present invention is to provide an asset management method for a substation to draw an optimized unique reliability model by each element of the substation through a process of compensating a reference reliability model by the each substation type and an apparatus for executing this.

The other object of the present invention is to provide an asset management method for a substation that satisfies clients' requested needs of equipment replacement cycles, maintenance plans, and asset management techniques and its apparatus for executing this.

The objects of the present invention are not limited to the aforementioned objects and other objects which have not been mentioned could be clearly understood by those skilled in the art from description below.

Means of Solving the Problem

An asset management method for a substation comprises steps of: determining whether to compensate a reliability model by each element of the substation by comparing reliability by a reference reliability model by each substation type with health index by the each element thereof generated based on state data and real-time monitoring data by the each element of the substation; compensating the reference reliability model by the each substation type and generating a unique reliability model by the each element of the substation by using the health index by the each element of the substation as a result of the determination; assessing system reliability index and economic feasibility by each maintenance scenario based on a pre-generated reference system reliability model for each candidate element subject to maintenance among the elements of the substation; and updating the unique reliability model by the each element of the substation as a result of executing maintenance after selecting a maintenance scenario by the each candidate element subject to maintenance as a result of the health index by the each element of the substation, the unique reliability model by the each element of the substation, the system reliability index, and the economic feasibility; wherein the reference reliability model by the each substation type is generated based on basic information on power equipment and information on failure history; and wherein the reference reliability model by the each substation type is generated by extracting failure data based on the basic information on power equipment and the information on failure history, partitioning the failure data before and after an optimal reference point in time, generating a reliability model for each dataset, estimating a shape parameter and a scale parameter, and drawing a mixture model from the synthesis of the reliability model of the each dataset.

Detailed matters of other example embodiments are included in detailed explanation and attached drawings.

Effects of the Invention

The present invention has an advantage of being capable of a reliability model by substation type based on basic information on power equipment and information on failure history of elements of a substation.

The present invention has also an advantage of being capable of deriving an optimized unique reliability model by each element of the substation through a process of compensating the reference reliability model by the each substation type.

In addition, the present invention has an advantage of satisfying clients' requested needs of equipment replacement cycles, maintenance plans and asset management techniques.

DETAILED DESCRIPTION OF THE PREFERRED EMBODIMENTS

Detailed example embodiments to implement the present invention will be explained below by referring to attached drawings.

Advantages and/or characteristics of the present invention and a method for achieving them will be clarified by referring to example embodiments described in details with attached drawings. However, the present invention will not be limited to example embodiments below but will be implemented in a variety of forms. The example embodiments herein will complete the commencement of the present invention and will be provided to completely inform those skilled in the art of the scope of the present invention in the technical field to which the present invention belongs and the present invention is just defined by the scope of claims. Same reference signs indicate same components over the whole specification.

Figure 1:
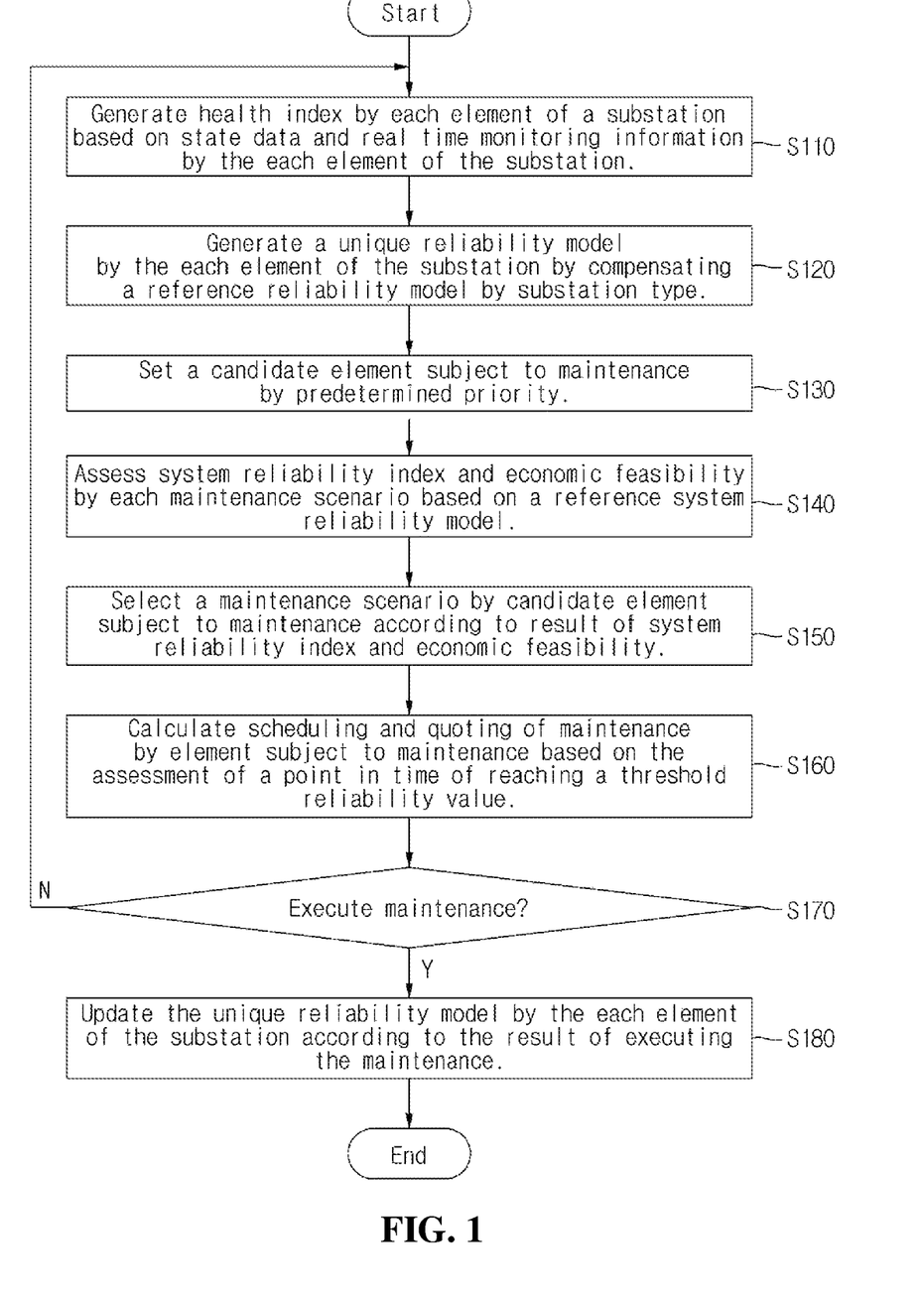
FIG. 1 is a flowchart to explain a process of managing substation assets in accordance with one example embodiment of the present invention.

FIG. 1 is a flowchart to explain a process of managing substation assets in accordance with one example embodiment of the present invention.

By referring to FIG. 1, an asset management apparatus 100 for a substation (see FIG. 3) generates a health index of each element of the substation based on state data and real time monitoring data of each element of the substation at S110. At the time, the state data and the real time monitoring data of the each element of the substation include online, offline, and remote monitoring state data of the each element of the substation. The offline monitoring state data may include at least one of data on installation history, checkup history, failure history, operating environment and operating history of each element of the substation.

In one example embodiment of S110, the asset management apparatus 100 for the substation may generate total score of, and actions against, technical risk depending on an operating environment, insulation deterioration, an electrical risk, a thermal risk, a chemical risk, a mechanical risk, airtightness performance, insulation performance, interrupting performance, and current-carrying performance of the each element of the substation.

For example, the asset management apparatus 100 for the substation may generate total score of, and actions against, technical risk depending on an operating environment, insulation deterioration, an electrical risk, a thermal risk, a chemical risk, and a mechanical risk of a transformer or TR by using information on a reference reliability model of the TR.

For another example, the asset management apparatus 100 for the substation may generate total score of, and actions against, technical risk depending on operating history data, airtightness performance, insulation performance, interrupting performance, and current-carrying performance of a gas insulated switchgear or GIS by using a reference reliability model of the GIS.

Next, the asset management apparatus 100 for the substation determines whether to compensate a reference reliability model for each substation type based on the reference reliability model for the each substation type and the health index of the each element of the sub station.

Herein, the reference reliability model for the each substation type is the generated reference reliability model for the each substation type based on basic information on power equipment and information on failure history.

In the present invention, the reference reliability model for the each substation type is calculated by extracting failure data based on the basic information on power equipment and the information on failure history, obtaining an optimal reference point in time which is when mean absolute deviation (MAD) becomes minimal, classifying the failure data before and after the optimal reference point in time into two datasets, calculating nonparametric reliability for each dataset using the Kaplan-Meier method, generating a reliability model through linear transformation in cumulative distribution function of the Weibull distribution, estimating a shape parameter (m) and a scale parameter ($\eta$) of the reliability model of the each dataset under the least square estimation method, and drawing a mixture model from a synthesis of the reliability model for the each dataset. Detailed explanation on this will be made later by referring to FIG. 2.

At the time, if the health index of the each element of the substation and the reliability of the reference reliability model for the each substation type are identical to each other, the asset management apparatus 100 for the substation does not compensate the reference reliability model for the each substation type by determining that the currently used reference reliability model for the each substation type is optimal.

In addition, if the health index of the each element of the substation and the reliability of the reference reliability model for the each substation type are different from each other, the asset management apparatus 100 for the substation generates a unique reliability model for the each element of the substation by compensating the reference reliability model for the each substation type at S120.

In short, if the health index of each element of the substation and the reliability of the reference reliability model for the each substation type are different from each other, the asset management apparatus 100 for the substation determines that the currently used reference reliability model for the each substation type is not an optimal reference reliability model and compensates the reference reliability model for the each substation type by using the health index of the each element of the substation, thereby generating a unique reliability model for the each element of the substation.

Through the above-stated process of compensating the reference reliability model for the each substation type, the optimal reference reliability model for the each element of the substation may be drawn.

After that, the asset management apparatus 100 for the substation sets each candidate element subject to maintenance depending on a predetermined priority at S130. For example, if a predetermined priority of the asset management apparatus 100 for the substation is a failure rate, it is possible to set candidate elements with high failure rates subject to maintenance depending on the predetermined priority. In addition, other priorities may be applied under different situations.

Since then, the asset management apparatus 100 for the substation assesses system reliability index and economic feasibility for each maintenance scenario based on a pre-generated reference system reliability model for the each candidate element subject to maintenance among the elements of the substation at S140.

In accordance with one example embodiment of S140, the asset management apparatus 100 for the substation assesses power outage costs, value of lost load, sensitivity by element, current value, and future value by applying failure rate, failure recovery time, load by loading point, repair costs, recovery costs, target maintenance costs, interest rate, equipment sensitivity, and parent-child relationships between the elements of the substation to the pre-generated reference system reliability model.

Besides, the asset management apparatus 100 for the substation selects a maintenance scenario for the each candidate element subject to maintenance as the result of the system reliability index and the economic feasibility at S150.

In accordance with one example embodiment of S150, the asset management apparatus 100 for the substation draws and selects a maintenance scenario for candidate element subject to maintenance including a maintenance strategy method, costs, and priority, checkup cycle, estimated costs, checkup scheduling, and assumed maintenance effects, and expected replacement time for the each element of the substation depending on an output value for assessing reliability, an output value for technical assessment, and an output value for economic feasibility of maintenance scenario and cost items by maintenance checkup.

In another example embodiment of S150, the asset management apparatus 100 for the substation generates a maintenance scenario from an aspect of costs, a maintenance scenario from an aspect of reliability, optimal checkup, and a replacement plan according to information on a first result generated by combining the health index of the each element of the substation and the reference reliability model for the each substation type, a second result generated by combining the health index, system reliability index, and economic feasibility for each element of the substation and a third result by combining the information on the second result and a maintenance plan.

Next, the asset management apparatus 100 for the substation calculates scheduling and quoting of maintenance for each candidate element subject to maintenance at S160.

In one example embodiment of S160, the asset management apparatus 100 for the substation may draw a point in time when a reliability standard on a substation fails to be fulfilled, i.e., when next maintenance is required. At the time, it may draw the point in time by calculating the future point in time that does not satisfy a threshold reliability value through calculation of reliability index of the substation assessed based on the unique reliability model for the each element.

As such, based on the point of time when the drawn next maintenance is required, maintenance scheduling and quoting for the each element subject to maintenance are calculated.

After the maintenance is executed by using the maintenance scenario for the each candidate element subject to maintenance at S170, the asset management apparatus 100 for the substation updates the unique reliability model for the each element of the substation as the result of executing the maintenance at S180.

Figure 2:
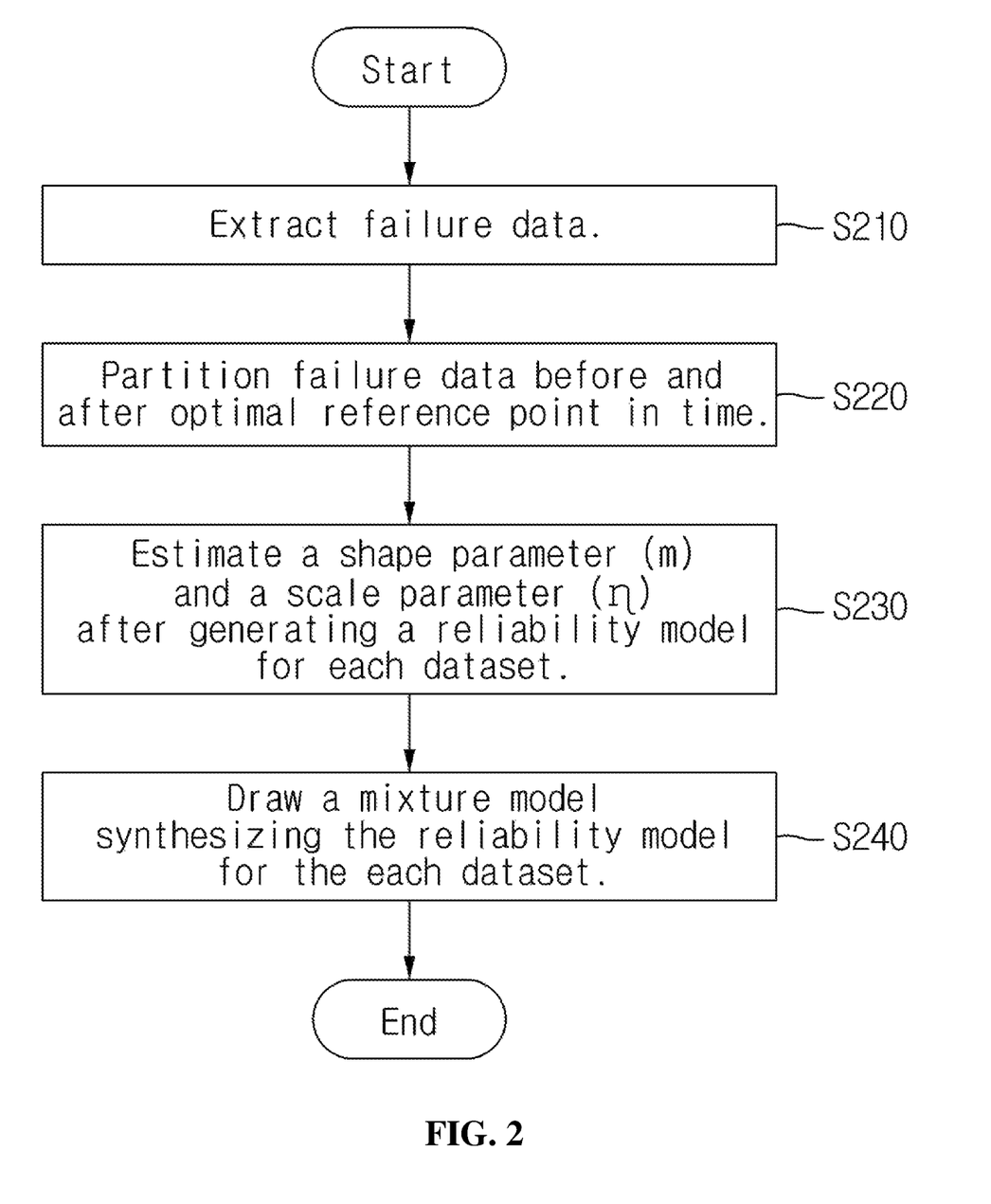
FIG. 2 is a flowchart representing a method of calculating a reference reliability model for each substation type in accordance with the present invention.

FIG. 2 is a flowchart representing a method of calculating a reference reliability model for each substation type in accordance with the present invention.

As seen in FIG. 2, a method of calculating the reference reliability model for the each substation type may include a step of extracting failure data at S210, partitioning failure data before and after an optimal reference point in time at S220, estimating a shape parameter (m) and a scale parameter($\eta$) after generating a reliability model by each dataset at S230, and drawing a mixture model synthesizing the reliability model for the each dataset at S240.

Herein, at the step of extracting failure data at S210, basic information on power equipment, including information on unique product number, date of manufacture, date of installation, and date of pressurization, etc., and information on failure history, including unique product number, history number, history type, date of accident occurring, date of starting an action, date of completing an action, date of re-operating, failure location, description on an action, etc. may be extracted.

Next, at the step of partitioning failure data before and after an optimal reference point in time at S220, an optimal reference point in time when failure data are partitioned is calculated and then the failure data are partitioned before and after the optimal reference point in time.

Herein, the optimal reference point in time is specified as the point in time when mean absolute deviation (MAD) of nonparametric reliability ($R^*(t)$) is minimal and the MAD may be represented as following equation 1. In other words, the MAD is defined as a value of integrating absolute difference between nonparametric reliability ($R^*(t)$) and a mixture model ($R_{mix}(t)$) synthesizing a reliability model of each dataset before and after a certain time of partitioning.

$$MAD = \int_0^{1max} |R_{mix}(t) - R^*(t)| dt \quad \text{[Equation 1]}$$

wherein $R^*(t)$ is nonparametric reliability; and $R_{mix}(t)$ is a mixture model synthesizing a reliability model for each dataset before and after a certain time of partitioning.

As explained above, the optimal reference point in time is defined as when the MAD is minimal. When a reliability function is integrated, average life span can be calculated as shown in equation 2 below. This means that difference of estimated average life spans is minimized.

$$E(T) = \int_0^\infty R(t) dt \quad \text{[Equation 2]}$$

wherein $R(t)$ is a reliability function and $E(T)$ is an average life span.

Next, at the step S230 of estimating a shape parameter (m) and a scale parameter ($\eta$) after generating the reliability model for the each dataset, nonparametric reliability for the each dataset using the Kaplan-Meier method is calculated and a reliability model through linear transformation in cumulative distribution function of the Weibull distribution is generated. After that, a shape parameter (m) and a scale parameter ($\eta$) of the reliability model for the each dataset are estimated under the least square estimation method.

In other words, cumulative failure probability ($F(t)$) of the each dataset is calculated by using the Kaplan-Meier method and nonparametric reliability is calculated in the following equation 3 based on alignment of time to failure, number of operating elements just before the time to failure, and number of elements that have failed:

$$R^*(t) = \prod_{i:t_{(i)}<t} \left(1 - \frac{d_i}{n_i}\right) \qquad \text{[Equation 3]}$$

wherein R*(t) is nonparametric reliability; the number of operating elements just before $t_{(i)}$=$n_i$; and the number of elements that have failed at $t_{(i)}$=$d_i$.

Besides, by linearly transforming a cumulative distribution function of Weibull for each dataset, a reliability model is generated and a shape parameter (m) and a scale parameter (η) of the reliability model are estimated by the least square estimation method.

In general, for failure rate function (λ(t)) distribution, there are three patterns: decreasing failure rate (DFR), constant failure rate (CFR), and increasing failure rate (IFR). Probability distribution is required to properly express depending on the distribution of such failure rate function and this is the Weibull distribution.

As shown in equation 4 below, among constants expressed in the Weibull distribution, m is a shape parameter and η is a scale parameter.

$$ln(=ln(R^*(t)))=m\,ln(t)-m\,ln\eta \qquad \text{[Equation 4]}$$

wherein R*(t) is nonparametric reliability; m is a shape parameter; and η is a scale parameter.

In general, the trend of a failure rate function is changing depending on the values of m. In other words, the Weibull distribution with m equal to 1 becomes exponential distribution and has a constant failure rate and the Weibull distributions with m<1 has a failure rate that decreases. If t increases, the distribution falls to 0. The Weibull distribution with m>1 has a failure rate that increases.

Herein, the part of a decreasing failure rate, the middle part of a low, relatively constant failure rate, and the part of an increasing failure rate are called early failure, random failure, and degradation failure or wearout failure.

The present invention is to draw a reliability model by using the Weibull distribution, i.e., to draw a reliability model for each dataset by putting a cumulative distribution function and failure data into the Weibull distribution function, applying the least square estimation method, and then estimating a shape parameter (m) and a scale parameter (η).

In addition, when the parameters of the Weibull distribution are obtained, mean time to failure (MTTF) as shown in the following equation 5 can be obtained:

$$MTTF = \eta\Gamma\left(1 + \frac{1}{m}\right) \qquad \text{[Equation 5]}$$

wherein m is a shape parameter; η is a scale parameter; and the gamma function is defined in equation 6 below.

$$\Gamma(x) = \int_0^\infty e^{-t}t^{x-1}dt \qquad \text{[Equation 6]}$$
$$= -t^{x-1}e^{-t}\Big|_0^\infty + (x-1)\int_0^\infty e^{-t}t^{x-2}dt$$
$$= (x-1)\Gamma(x-1)$$

Next, at a step S240 of drawing a mixture model synthesizing a reality model for each dataset, the Weibull mixture model is drawn by synthesizing the reliability model calculated for the each dataset to calculate a reference reliability model for the each substation type.

In the present invention, the reference reliability model may be drawn for the each substation type through the method as explained above and based on this, an optimized management plan for the each element of the substation may be drawn.

Figure 3:
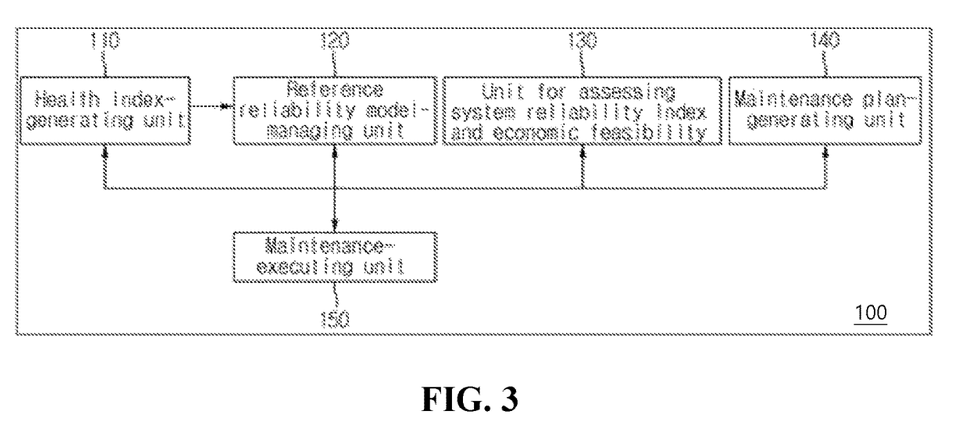
FIG. 3 is a block diagram to explain an internal structure of the asset management apparatus for the substation in accordance with one example embodiment of the present invention.

FIG. 3 is a block diagram to explain an internal structure of the asset management apparatus for the substation in accordance with one example embodiment of the present invention.

By referring to FIG. 3, the asset management apparatus 100 for the substation includes a health index-generating unit 110, a reference reliability model-managing unit 120, a unit 130 for assessing system reliability index and economic feasibility, a maintenance plan-generating unit 140, and a maintenance-executing unit 150.

The health index-generating unit 110 generates a health index of each element of the substation by using the state data and the real time monitoring data of the each element of the substation. At the time, the state data and the real time monitoring data of the each element of the substation includes online, offline, and remote monitoring state data of the each element of the substation. The offline monitoring state data may include at least one of data on installation history, checkup history, failure history, operating environment, and operating history of the each element of the substation.

In accordance with one example embodiment of the present invention, the health index-generating unit 110 may generate total score of, and actions against, technical risk depending on an operating environment, insulation deterioration, an electrical risk, a thermal risk, a chemical risk and a mechanical risk, airtightness performance, insulation performance, interrupting performance, and current-carrying performance for the each element of the substation based on the state data and the real time monitoring data of the each element of the sub station.

For example, the health index-generating unit 110 may generate total score of, and actions against, technical risk depending on an operating environment, insulation deterioration, an electrical risk, a thermal risk, a chemical risk, and a mechanical risk of a TR by using information on a reference reliability model of the TR.

For another example, the health index-generating unit 110 may generate total score of, and actions against, technical risk depending on operating history data, airtightness performance, insulation performance, interrupting performance, and current-carrying performance of a GIS by using a reference reliability model of the GIS.

The reference reliability model-managing unit 120 determines whether to compensate a reference reliability model for each substation type based on the reference reliability model for the each substation type and the health index of the each element of the substation.

As explained above, in the present invention, to calculate the reference reliability model for the each substation type, failure data are extracted based on the basic information on power equipment and the information on failure history and the optimal reference point in time, when mean absolute deviation (MAD) is minimal, is obtained and failure data before and after the optimal reference point in time are partitioned into two datasets, and nonparametric reliability is calculated using the Kaplan-Meier method for each dataset. After a reliability model is generated through linear transformation in cumulative distribution function of the Weibull distribution, a shape parameter (m) and a scale parameter (η)

of the reliability model of the each dataset under the least square estimation method are estimated and a mixture model synthesizing the reliability model for the each dataset is drawn. The reliability model is finally calculated.

At the time, if the health index of the each element of the substation is identical to the reliability of the reference reliability model for the each substation type, the reference reliability model-managing unit 120 does not compensate the reference reliability model for the each substation type by determining that the currently used reference reliability model for the each substation type is an optimal reference reliability model.

In addition, if the health index of each element of the substation is different from the reliability of the reference reliability model for the each substation type, the reference reliability model-managing unit 120 generates a unique reliability model for each element of the substation by compensating the reference reliability model for the each substation type.

In short, if the health index of each element of the substation is different from the reliability of the reference reliability model for the each substation type, the reference reliability model-managing unit 120 determines that the currently used reference reliability model for the each substation type is not an optimal reference reliability model and uses the health index of the each element of the substation and then compensates the reference reliability model for the each substation type, thereby generating a unique reliability model for each element of the substation.

As seen above, the present invention may optimize the unique reliability model for the each element of the substation by compensating the reference reliability model for the each substation type depending on the health index of the each element of the substation, instead of continuously using the reference reliability model for the each substation type.

After setting each candidate element subject to maintenance among the elements of the substation depending on a predetermined priority, the unit 130 for assessing system reliability index and economic feasibility assesses system reliability index and economic feasibility for each maintenance scenario based on a pre-generated reference system reliability model for the each candidate element subject to maintenance.

After applying failure rate, failure recovery time, load by loading point, repair costs, recovery costs, target maintenance costs, interest rate, equipment sensitivity, and parent-child relationships between the elements of the substation to the pre-generated reference system reliability model, the unit 130 for assessing system reliability index and economic feasibility in accordance with one example embodiment of the present invention assesses the system reliability index and the economic feasibility for the each maintenance scenario by generating power outage costs, value of lost load, sensitivity by element, i.e., from economical and reliability aspects, a result of analysis of economic feasibility, i.e., current value, and future value.

The maintenance plan-generating unit 140 selects a maintenance scenario for the each candidate element subject to maintenance as the result of the health index of the each element of the substation, the reference reliability model for the each substation type, the system reliability index, and the economic feasibility.

At the time, the maintenance plan-generating unit 140, first, draws a point in time of failing to satisfy a reliability standard of the substation, i.e., a point in time when next maintenance is required. The point in time when next maintenance is required may be drawn by calculating reliability index of the substation assessed based on the unique reliability model for the each element and then calculating future time which fails to satisfy a threshold reliability value. The maintenance plan-generating unit 140 may calculate maintenance scheduling and quoting for element subject to maintenance based on the drawn time of requiring next maintenance.

In accordance with one example embodiment of the present invention, the maintenance plan-generating unit 140 draws and selects a maintenance scenario for the each candidate element subject to maintenance, including a maintenance strategy method, costs, and priority of the each element of the substation, checkup cycle, estimated costs, checkup scheduling, and assumed maintenance effects for the each element of the substation, and expected replacement time for the each element of the substation depending on an output value for assessing reliability, an output value for technical assessment, and an output value for economic feasibility for the each maintenance scenario.

In accordance with another example embodiment of the present invention, the maintenance plan-generating unit 140 generates a maintenance scenario from an economical aspect, a maintenance scenario from a reliability aspect, optimal checkup, and a replacement plan according to information on a first result generated by combining the health index generated by the health index-generating unit 110 and the reference reliability model generated by the reference reliability model-managing unit 120, a second result generated by combining the health index generated by the health index-generating unit 110 and the system reliability index, and the economic feasibility generated by the unit 130 for assessing system reliability index and economic feasibility and a third result by combining the information on the second result and a maintenance plan generated by the maintenance plan-generating unit 140.

The maintenance-executing unit 150 updates the unique reliability model for the each element of the substation as the result of executing the maintenance under the maintenance scenario for the candidate element subject to maintenance selected by the maintenance plan-generating unit 140.

Figure 4:
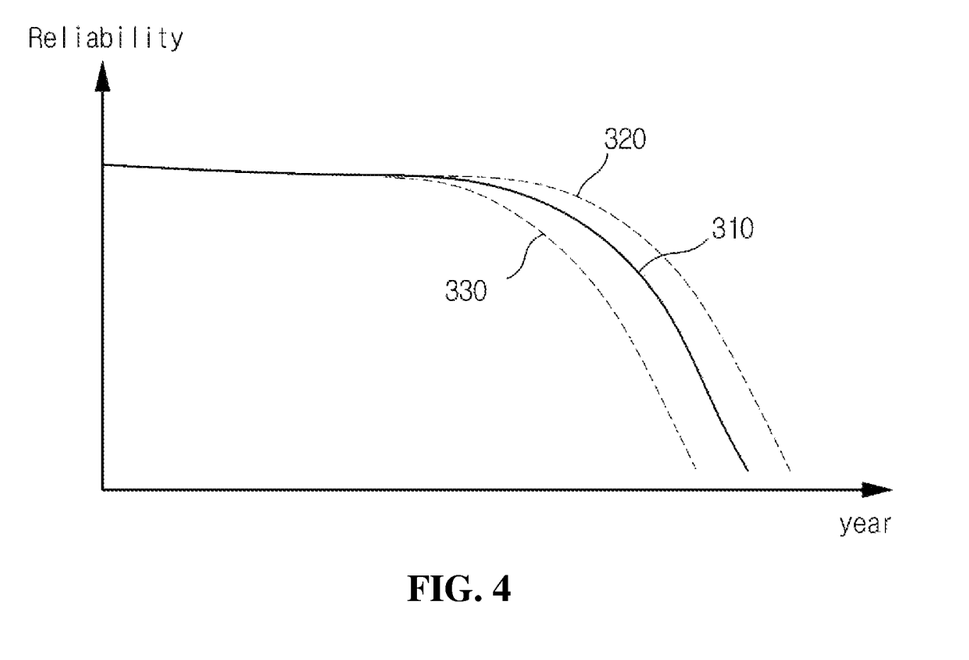
FIG. 4 is a graph to explain a process of determining whether to compensate a reference reliability model for each substation type in accordance with one example embodiment of the present invention.

FIG. 4 is a graph to explain a process of determining whether to compensate a reference reliability model for each substation type in accordance with one example embodiment of the present invention.

By referring to FIG. 4, the asset management apparatus 100 for the substation determines whether to compensate a reference reliability model for each substation type by comparing reliability 310 of the reference reliability model for the each substation type with reliability 320, 330 depending on the generated health index of the each element of the substation based on the state data and the real time monitoring data of the each element of the substation. As explained above, the reference reliability model for the each substation type is the generated reference reliability model for the each substation type based on data on installation and checkup history, data on analysis of obsolete and removed items, and data on accelerated life tests of the each element of the substation.

Herein, a drawing reference number 320 represents that the reliability depending on the health index of the each element of the substation is higher than the reliability 310 of the reference reliability model for the each substation type and a drawing reference number 330 represents that the reliability depending on the health index of the each element of the substation is lower than the reliability 310 of the reference reliability model for the each substation type.

In accordance with one example embodiment of the present invention, if the reliability 310 of the reference reliability model for the each substation type is different from the reliability 320, 330 by the generated health index of the each element of the substation based on the state data and the real time monitoring data of the each element of the substation, the asset management apparatus 100 for the substation calculates a unique reliability model for each element of the substation by compensating the reference reliability model for the each substation type.

In other words, if the reliability 320, 330 depending on the health index of the each element of the substation is different from the reliability 310 of the reference reliability model for the each substation type, the asset management apparatus 100 for the substation determines that the currently used reference reliability model for the each substation type is not an optimal reference reliability model and compensates the reference reliability model for the each substation type depending on the health index of the each element of the substation, thereby calculating the unique reliability model for the each element of the substation.

Meanwhile, if the reliability depending on the generated health index of the each element of the substation based on the state data and the real time monitoring data of the each element of the substation overlaps with the reliability 310 of the reference reliability model for the each substation type, the asset management apparatus 100 for the substation does not compensate the reference reliability model for the each substation type by determining that the currently used reference reliability model for the each substation type is optimal.

The present invention may draw an optimized unique reliability model for the each element of the substation through a process of compensating the reference reliability model for the each substation type as shown above.

Figure 5:
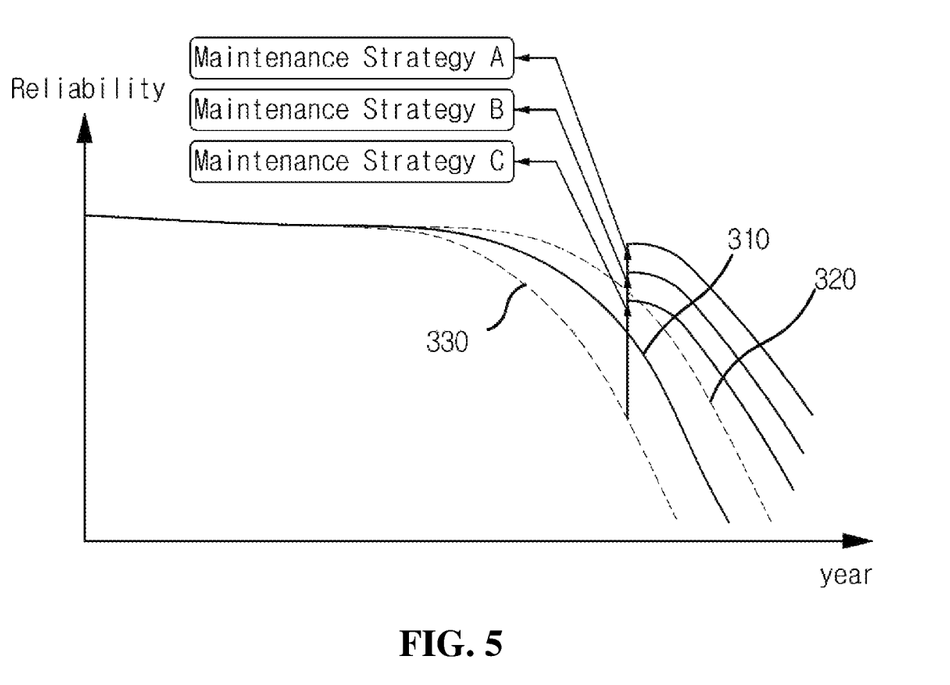
FIG. 5 is a graph to explain changes in reliability of each maintenance scenario for each element of the substation in accordance with one example embodiment of the present invention.

FIG. 5 is a graph to explain changes in reliability of each maintenance scenario for the each element of the substation in accordance with one example embodiment of the present invention.

In accordance with one example embodiment of the present invention, a standard on improving reliability by a maintenance method may be set differently. For example, the reliability would be possible to be set to 100% for replacement of an element as a maintenance method, 30% for precise inspection, and 15% for normal inspection but depending on history of actual maintenance carried out, the reliability may be differently set according to the maintenance under precise inspection and normal inspection.

In FIG. 5, it can be found that maintenance strategy A, as a maintenance scenario including the replacement of an element, shows the most greatly improved reliability while maintenance strategy B as a precise inspection-centered maintenance scenario shows the moderately improved reliability.

Meanwhile, it can be found that maintenance strategy C as a maintenance scenario in center of normal inspection shows the least greatly improved reliability.

As shown above, the present invention has been explained by limited example embodiments and drawings but it is not limited to the example embodiments. Various changes and modifications may be derived from those skilled in the art. Accordingly, the invention must be identified by the claims of the present invention as described below and all variables and equivalents would appertain to the scope of the ideas of the present invention.

REFERENCE NUMERALS

100: Asset management apparatus for a substation
110: Health index-generating unit
120: Reference reliability model-managing unit
130: Unit for assessing system reliability index and economic feasibility
140: Maintenance plan-generating unit
150: Maintenance-executing unit

INDUSTRIAL AVAILABILITY

The present invention relates to an asset management method for a substation and is available in a field of power equipment.

What is claimed is:

1. An asset management method for a substation, comprising:
determining, by a reference reliability model manager, whether to compensate a unique reliability model for each element of the substation by comparing a reliability of a reference reliability model for each substation type with a health index of each element thereof generated based on state data and real-time monitoring data of each element of the substation at a health index generator;
compensating, by the reference reliability model manager, the reference reliability model for each substation type and generating the unique reliability model for each element of the substation by using the health index of each element of the substation as a result of the determination;
assessing, by a system reliability index and economic feasibility manager, system reliability index and economic feasibility for each maintenance scenario based on a predetermined reference system reliability model for each candidate element subject to maintenance among the elements of the substation; and
updating, by the reference reliability model manager, the unique reliability model for each element of the substation as a result of executing the maintenance after determining each maintenance scenario for each candidate element subject to maintenance as a result of the health index for each element of the substation, the unique reliability model for each element of the substation, the system reliability index, and the economic feasibility;
wherein the reference reliability model for each substation type is calculated by extracting failure data based on the basic information on power equipment and the information on failure history, obtaining an optimal reference point in time, classifying the failure data before and after the optimal reference point in time into datasets, calculating a nonparametric reliability for each dataset using a Kaplan-Meier method, generating the unique reliability model through linear transformation in a cumulative distribution function of a Weibull distribution for each dataset, estimating a shape parameter and a scale parameter of the unique reliability model for each dataset under the least square estimation method, and drawing the mixture model from the synthesis of the unique reliability model for each dataset;
wherein the optimal reference point in time is a point in time when mean absolute deviation (MAD) becomes minimal;
wherein the MAD is a value of integrating absolute difference between the nonparametric reliability ($R^*(t)$) and the mixture model ($Rmix(t)$) synthesizing the unique reliability model for each dataset before and after a certain time of partitioning;

wherein generating the health index of each element of the substation based on state data and real-time monitoring data of each element of the substation includes generating the health index of each element of the substation by using online, offline, and remote monitoring state data of each element of the substation;

wherein the offline monitoring state data includes at least one of data on installation history, checkup history, failure history, operating environment, and operating history of each element of the substation;

wherein, when the health index of each element of the substation based on state data and real-time monitoring data of each element of the substation is generated, total score of, and actions against, technical risk depending on an operating environment, insulation deterioration, an electrical risk, a thermal risk, a chemical risk, a mechanical risk, airtightness performance, insulation performance, interrupting performance, and current-carrying performance for each element of the substation is also generated;

wherein compensating the reference reliability model for each substation type and generating the unique reliability model for each element of the substation by using the health index of each element of the substation as a result of the determination includes compensating the reference reliability model for each substation type by applying the health index of each element of the substation to the reference reliability model for each substation type if the reliability of the reference reliability model for each substation type and the health index of each element of the substation are different, the reliability model manager determines that the reference reliability model for each substation type is not optimal, and generates the unique reliability model for each element of the substation thereafter;

wherein assessing system reliability index and economic feasibility for each maintenance scenario based on the predetermined reference system reliability model for each candidate element subject to maintenance among the elements of the substation includes assessing power outage costs, value of lost load, sensitivity of element, current value, and future value by applying failure rate, failure recovery time, load by loading point, repair costs, recovery costs, target maintenance costs, interest rate, equipment sensitivity, and parent-child relationships between the elements of the substation to the predetermined reference system reliability model; and wherein assessing system reliability index and economic feasibility for each maintenance scenario based on the predetermined reference system reliability model for each candidate element subject to maintenance among the elements of the substation further includes selecting a candidate element subject to maintenance among the elements of the substation depending on predetermined priorities.

2. The method of claim 1, wherein determining each maintenance scenario for each candidate element subject to maintenance as a result of the health index of each element of the substation, the unique reliability model for each element of the substation, the system reliability index, and the economic feasibility includes:
determining a quote of each maintenance scenario for the candidate element subject to maintenance including a maintenance strategy method, costs, and priority of each element of the substation, checkup cycle, estimated costs, checkup scheduling, and assumed maintenance effects of each element of the substation, and expected replacement time for each element thereof depending on an output value for assessing reliability, an output value for technical assessment, and an output value for economic feasibility of each maintenance scenario.

3. The method of claim 2, wherein updating the unique reliability model for each element of the substation as a result of the maintenance executed includes updating the unique reliability model for each element of the substation by applying improvement effects as the result of executing the maintenance.

4. The method of claim 2, wherein a point in time of reaching a threshold reliability assessed based on the unique reliability model for each element of the substation is assessed, and wherein maintenance scheduling and quoting for each candidate element subject to maintenance are calculated thereafter.

* * * * *